(12) United States Patent
Kim et al.

(10) Patent No.: US 12,494,701 B2
(45) Date of Patent: Dec. 9, 2025

(54) HIGH-TEMPERATURE SUPERCONDUCTING ROTATING MACHINE EQUIPPED WITH FIXED-TYPE ROTOR CRYOSTAT FOR CRYOGEN AND STATOR COOLING STRUCTURE USING OF VAPORIZED CRYOGEN FROM ROTOR

(71) Applicant: INDUSTRY-ACADEMIC COOPERATION FOUNDATION JEJU NATIONAL UNIVERSITY, Jeju-si (KR)

(72) Inventors: Ho Min Kim, Jeju-si (KR); Ji Hyung Kim, Jeju-si (KR); Yoon Seok Chae, Jeju-si (KR)

(73) Assignee: INDUSTRY-ACADEMIC COOPERATION FOUNDATION JEJU NATIONAL UNIVERSITY, Jeju-si (KR)

( * ) Notice: Subject to any disclaimer, the term of this patent is extended or adjusted under 35 U.S.C. 154(b) by 216 days.

(21) Appl. No.: 18/498,099

(22) Filed: Oct. 31, 2023

(65) Prior Publication Data
US 2024/0136908 A1    Apr. 25, 2024
US 2024/0235361 A9    Jul. 11, 2024

Related U.S. Application Data

(63) Continuation of application No. PCT/KR2022/095114, filed on Aug. 23, 2022.

(30) Foreign Application Priority Data

Aug. 30, 2021    (KR) .................... 10-2021-0114863

(51) Int. Cl.
*H02K 55/04*    (2006.01)
*H02K 5/20*    (2006.01)
(Continued)

(52) U.S. Cl.
CPC ............. *H02K 55/04* (2013.01); *H02K 5/203* (2021.01); *H02K 9/193* (2013.01); *H02K 9/20* (2013.01)

(58) Field of Classification Search
CPC ........ H02K 55/04; H02K 55/02; H02K 55/00; H02K 5/203; H02K 9/193; H02K 9/20; H01F 6/06; H01F 6/00; Y02E 40/60
(Continued)

(56) References Cited

U.S. PATENT DOCUMENTS

2002/0171303 A1*  11/2002  Laskaris ................ H02K 3/527
                                                    310/91
2010/0201220 A1*  8/2010  Zhang .................... H02K 55/04
                                                    310/216.108

FOREIGN PATENT DOCUMENTS

JP    2010093886 A   *  4/2010
KR    10-1349362 B1     1/2014
(Continued)

OTHER PUBLICATIONS

Machine translation of JP-2010093886-A. (Year: 2010).*
Machine translation of KR-102112045-B1. (Year: 2020).*

*Primary Examiner* — Michael Andrews
(74) *Attorney, Agent, or Firm* — NKL LAW; Jae Youn Kim

(57) ABSTRACT

The present invention relates to a high-temperature superconducting rotating machine system equipped with a fixed type cryostat and a vaporized cryogen re-use cooling structure.
The high-temperature superconducting rotating machine system equipped with a fixed type cryostat and a vaporized cryogen re-use cooling structure is configured to allow the cryostat as an immovable structure (fixed structure) where a liquid refrigerant is normally stored to be disposed in a rotor part where a high-temperature superconducting field core (Continued)

and a direct current power generator for a non-contact type exciter are located, so that a manufacturing and constructing structure becomes more simplified when compared with an existing cryogenic cooling structure (wherein a special and complicated cooling structure is needed to supply a cryogen to a high-temperature superconducting field coil rotating at a given speed) upon cryogenic cooling, thereby greatly improving the operation reliability, maintainability, and profitability of the rotating machine system.

7 Claims, 7 Drawing Sheets

(51) Int. Cl.
*H02K 9/193* (2006.01)
*H02K 9/20* (2006.01)

(58) Field of Classification Search
USPC .................................................. 310/52, 54
See application file for complete search history.

(56) References Cited

FOREIGN PATENT DOCUMENTS

| KR | 101376708 B1 | 3/2014 | |
|---|---|---|---|
| KR | 1020140086483 A | 7/2014 | |
| KR | 101766684 B1 | 8/2017 | |
| KR | 102112045 B1 * | 5/2020 | ............. H01F 6/04 |
| KR | 102371280 B1 | 3/2022 | |

* cited by examiner

HIGH-TEMPERATURE SUPERCONDUCTING ROTATING MACHINE EQUIPPED WITH FIXED-TYPE ROTOR CRYOSTAT FOR CRYOGEN AND STATOR COOLING STRUCTURE USING OF VAPORIZED CRYOGEN FROM ROTOR

TECHNICAL FIELD

The present invention relates to a high-temperature superconducting rotating machine system equipped with a fixed type cryostat and a vaporized cryogen re-use cooling structure that is configured to allow the cryostat as an immovable structure (fixed structure) where a liquid refrigerant is normally stored to be disposed in a rotor part where a high-temperature superconducting field core and a direct current power generator for a non-contact type exciter are located, so that a manufacturing and constructing structure becomes more simplified when compared with an existing cryogenic cooling structure (wherein a special and complicated cooling structure is needed to supply a cryogen to a high-temperature superconducting field coil rotating at a given speed) upon cryogenic cooling, thereby greatly improving the operation reliability, maintainability, and profitability of the rotating machine system.

Further, the present invention relates to a high-temperature superconducting rotating machine system equipped with a fixed type cryostat and a vaporized cryogen re-use cooling structure that is configured to allow a separate cryostat (sub cooling chamber) to be defined for a stator and a magnetic flux generator (supply part) for a non-contact type exciter, so that the gas refrigerant vaporized (exhausted and thrown away in the air in existing systems) after cooling a rotor is collected and re-used in the cryostat (the sub cooling chamber), thereby greatly improving the cooling performance and efficiency of the rotating machine system.

BACKGROUND ART

Generally, a high-temperature superconducting rotating machine is configured to have a cryostat rotating together with a rotor to perform rotor cooling, and in this case, the cryostat is provided as an outer case structure of the rotor to achieve vacuum insulation.

Such a conventional cryostat necessarily requires special and complicated devices such as a magnetic fluid seal for connecting a rotary part and a stationary part, a triple refrigerant pipe, and the like to supply a cryogen to the rotor rotating at a given speed, thereby increasing manufacturing and maintenance costs of the rotating machine system and lowering the profitability of the system.

Further, the conventional cryostat has a double or triple cylinder structure to ensure the cryogenic cooling of the rotor, which causes an electromagnetic air gap to become increased, so that the energy density of the rotor is decreased and even upon rotation, a high-level vacuum insulation design is required to maintain a vacuum state. Furthermore, a special and complicated vacuum pumping system is needed to operate a vacuum pump even during the rotation.

Besides, the conventional high-temperature superconducting rotating machine has a separate cooling system using natural convection, forced convection by a blower, forced convection by the circulation of cooling water, and the like according to cooling capacities so as to cool a stator part located on a normal temperature portion.

Further, the installation of the separate cooling system causes additional costs including manufacturing and maintenance costs, and since a normal temperature cooling fluid is used, limitations in cooling performance occur. Besides, the upper limit exists in increasing the energy density of the high-temperature superconducting rotating machine system.

PRIOR ART LITERATURE

Patent Literature (Patent literature 1) 1. Korean Patent No. 10-1349362 (Issued on Jan. 2, 2014)

DISCLOSURE OF THE INVENTION

Technical Problems to be Solved

It is an object of the present invention to provide a high-temperature superconducting rotating machine system equipped with a fixed type cryostat and a vaporized cryogen re-use cooling structure that is configured to allow the cryostat as an immovable structure (fixed structure) where a liquid refrigerant is normally stored to be disposed in a rotor part where a high-temperature superconducting field core and a direct current power generator for a non-contact type exciter are located, so that a manufacturing and constructing structure becomes more simplified when compared with an existing cryogenic cooling structure (wherein a special and complicated cooling structure is needed to supply a cryogen to a high-temperature superconducting field coil rotating at a given speed) upon cryogenic cooling, thereby greatly improving the operation reliability, maintainability, and profitability of the rotating machine system.

It is another object of the present invention to provide a high-temperature superconducting rotating machine system equipped with a fixed type cryostat and a vaporized cryogen re-use cooling structure that is configured to allow a separate cryostat (sub cooling chamber) to be defined for a stator and a magnetic flux generator (supply part) for a non-contact type exciter, so that the gas refrigerant vaporized (exhausted and thrown away in the air in existing systems) after cooling a rotor is collected and re-used in the cryostat (the sub cooling chamber), thereby greatly improving the cooling performance and efficiency of the rotating machine system.

Technical Solutions

To accomplish the above-mentioned objects, according to the present invention, there is provided a high-temperature superconducting rotating machine system equipped with a fixed type cryostat and a vaporized cryogen re-use cooling structure, the high-temperature superconducting rotating machine system including: a superconducting rotating machine 100 having a rotor core 110 disposed vertically thereon, a rotor 120 provided by locating a high-temperature superconducting field coil in a circumferential direction of the rotor core 110, and a stator 130 provided by locating a superconducting armature coil on the outside of the rotor 120, the rotor core 110 and the rotor 120 being connected to a rotor shaft 140 on both longitudinal ends thereof to rotate supportedly by rotary seals and support bearings; a cryostat 200 for entirely surrounding the outer peripheral surfaces of the rotor 120 and the stator 130, as a single outer case, or individually surrounding the rotor 120 and the stator 130, to perform cooling for both of the rotor 120 and the stator 130 or for the rotor 120 and the stator 130 individually; and a cryogenic cooling system 300 for supplying a liquid refrigerant to the cryostat 200 or collecting and circulating a gas refrigerant from the cryostat 200.

According to an embodiment of the present invention, a direct current power generator and a magnetic flux generator for a non-contact type exciter are additionally provided (as shown in FIGS. 1 to 5). In this case, the direct current power generator for the non-contact type exciter is disposed on one side of the high-temperature superconducting field coil of the rotor core 110 and has a flux pump header 160 that is electrically conductive to the rotor core 110 in such a way as to interlockingly rotate with the rotor core 110, and the magnetic flux generator for the non-contact type exciter has permanent magnets or electromagnets 170 disposed on the radial side of the flux pump header 160 to perform demagnetization or magnetization.

According to another embodiment of the present invention, a direct current power generator and a magnetic flux generator for a non-contact type exciter are additionally provided (as shown in FIGS. 6 and 7). In this case, the direct current power generator for the non-contact type exciter is disposed on one side of the high-temperature superconducting field coil of the rotor core 110 and has a flux pump header 160 that is electrically conductive to the rotor core 110 in such a way as to interlockingly rotate with the rotor core 110, and the magnetic flux generator for the non-contact type exciter has permanent magnets or electromagnets 170 disposed on the axial and radial sides of the flux pump header 160 and rotates by means of a rotary motor 190 coupled to the end of one side rotor shaft.

According to an embodiment of the present invention, the cryostat 200 includes a main cooling chamber 210 for individually defining the direct current power generator for the non-contact type exciter with the flux pump header 160, the rotor 120, and portions of both sides of the rotor shaft 140 branched along an axial line of the rotor 120, a sub cooling chamber 220 additionally defined in a radial direction of the main cooling chamber 210 to individually define the stator 130, the permanent magnets or electromagnets 170 or the permanent magnets 180 for the exciter of the magnetic flux generator for the non-contact type exciter, an inlet pipe 211 located on one side of the main cooling chamber 210 to introduce the liquid refrigerant, a communication pipe 212 located on the other side of the main cooling chamber 210 to transfer the vaporized gas refrigerant to the sub cooling chamber 220, and a discharge pipe 221 disposed on the outer surface of the sub cooling chamber 220 in such a way as to be connected to the cryogenic cooling system 300 to perform external circulation of the gas refrigerant (See FIGS. 1 and 2 for cryostat division).

According to another embodiment of the present invention, further, the sub cooling chamber 220 has a return supply pipe 222 disposed on one side of the outer surface thereof in such a way as to be connected to a collection pipe 215 of the main cooling chamber 210, and the main cooling chamber 210 has a re-condensing cooler 213 and a re-condensing heat exchanger 214 disposed on one side of the inside thereof to perform re-condensation and re-liquefication of the gas refrigerant supplied from the sub cooling chamber 220 (See FIG. 3 for cryostat division). According to yet another embodiment of the present invention, the cryostat 200 includes a main cooling chamber 210 for individually defining the direct current power generator for the non-contact type exciter with the flux pump header 160, the rotor 120, and portions of both sides of the rotor shaft 140 branched along an axial line of the rotor 120, a sub cooling pipe 230 additionally defined in a radial direction of the main cooling chamber 210 to individually define, in the form of a connection pipe or hose, the stator 130, the permanent magnets or electromagnets 170 or the permanent magnets 180 for the exciter of the magnetic flux generator for the non-contact type exciter, an inlet pipe 211 located on one side of the main cooling chamber 210 to introduce the liquid refrigerant, a communication pipe 212 located on the other side of the main cooling chamber 210 to transfer the vaporized gas refrigerant to the sub cooling pipe 230, and a discharge pipe 221 disposed on the end portion of the sub cooling pipe 230 in a longitudinal direction in such a way as to be connected to the cryogenic cooling system 300 to perform external circulation of the gas refrigerant (See FIG. 4 for cryostat division).

According to an additional embodiment of the present invention, the cryostat 200 includes a main cooling chamber 210 for individually defining the direct current power generator for the non-contact type exciter with the flux pump header 160, the magnetic flux generator for the non-contact type exciter with the permanent magnets or electromagnets 170, the rotor 120, and portions of both sides of the rotor shaft 140 branched along an axial line of the rotor 120, a sub cooling chamber 220 additionally defined in a radial direction of the main cooling chamber 210 to individually define only the outer peripheral surface of the stator 130, an inlet pipe 211 located on one side of the main cooling chamber 210 to introduce the liquid refrigerant, a communication pipe 212 located on the other side of the main cooling chamber 210 to transfer the vaporized gas refrigerant to the sub cooling chamber 220, and a discharge pipe 221 disposed on the outer surface of the sub cooling chamber 220 in such a way as to be connected to the cryogenic cooling system 300 to perform external circulation of the gas refrigerant (See FIG. 5 for cryostat division).

According to another additional embodiment of the present invention, the cryostat 200 includes a main cooling chamber 210 for individually defining the direct current power generator for the non-contact type exciter with the flux pump header 160, the magnetic flux generator for the non-contact type exciter with the permanent magnets 180 for the exciter, the rotor 120, and portions of both sides of the rotor shaft 140 branched along an axial line of the rotor 120, a sub cooling chamber 220 additionally defined in a radial direction of the main cooling chamber 210 to individually define only the outer peripheral surface of the stator 130, an inlet pipe 211 located on one side of the main cooling chamber 210 to introduce the liquid refrigerant, a communication pipe 212 located on the other side of the main cooling chamber 210 to transfer the vaporized gas refrigerant to the sub cooling chamber 220, and a discharge pipe 221 disposed on the outer surface of the sub cooling chamber 220 in such a way as to be connected to the cryogenic cooling system 300 to perform external circulation of the gas refrigerant (See FIG. 6 for cryostat division).

Further, the main cooling chamber 210 has a re-circulation supply pipe 217 disposed on one side of the outer surface thereof in such a way as to be connected to a bypass pipe 216 disposed on the other side thereof, and the main cooling chamber 210 has the re-condensing cooler 213 and the re-condensing heat exchanger 214 disposed on one side of the inside thereof to perform re-condensation and re-liquefication of the gas refrigerant supplied from the sub cooling chamber 220 (See FIG. 7 for cryostat division).

Moreover, the cryostat 140 is formed of a double jacket consisting of an inner case and an outer case, and a vacuum is formed in a space between the inner case and the outer case.

Advantageous Effectiveness of the Invention

As described above, the high-temperature superconducting rotating machine system according to the present invention is configured to allow the liquid refrigerant to be supplied to the cryostat being in a stopped state, thereby making it possible to design a simplified cooling structure to reduce manufacturing and maintenance costs (In the case of the existing cooling structure for a high-temperature superconducting rotating machine, a refrigerant supply device including a magnetic fluid seal, a triple refrigerant pipe, etc. is additionally provided to transfer a cryogen to the rotor rotating at a given speed).

According to the present invention, further, the high-temperature superconducting rotating machine system is possible to supply the liquid refrigerant to the cryostat being in a stopped state, thereby being stable in the supply of the liquid refrigerant and improving the cooling performance of the rotor.

According to the present invention, the high-temperature superconducting rotating machine system is possible to design a relatively short rotating shaft, thereby making the rotor become small and lightweight (In the case of the existing cooling structure using the magnetic fluid seal, a long rotating shaft is designed intentionally, which requires a design for preventing the magnetic fluid seal coupled to a rotor shaft located on a normal temperature portion from being frozen due to temperature gradient on a cryogenic temperature portion).

According to the present invention, the high-temperature superconducting rotating machine system is normally connected to a vacuum pump being in a stopped state on the normal temperature portion to constantly maintain a target degree of vacuum, thereby reducing a risk of vacuum leakage (In the case of the existing cryostat having a double wall structure, it normally rotates during a rotational operation, and accordingly, a special and complicated vacuum pump system is needed to perform vacuum pumping for the rotating rotor).

According to the present invention, the vaporized refrigerant re-use cooling structure enables the design of the system in configuration to be simplified when the cryostat for the rotor has the circulation path with the stator cooling jacket and the refrigerant circulation pipe.

According to the present invention, further, the cooling fluid used for cooling the rotor is collected and re-used to cool the stator, so that no additional cooling facility for cooling the stator is needed, thereby reducing a life cycle cost including manufacturing and maintenance costs of the rotating machine system to increase the profitability of the system.

According to the present invention, the low temperature vaporized refrigerant is re-used to cool the stator, thereby improving the cooling performance of the copper armature coil for the rotor and the copper electromagnets for the magnetic flux generator for the non-contact type exciter to increase the energy density of the system or to make the system become small and lightweight.

According to the present invention, the magnetic flux generator for the non-contact type exciter is disposed inside the fixed type cryostat to minimize the air gap, unlike that the magnetic flux generator is located on the normal temperature portion on the boundary of the double cryostat, thereby optimizing the charging performance of the non-contact type exciter.

EMBODIMENTS OF THE INVENTION

Hereinafter, embodiments of the present invention will be explained in detail with reference to the attached drawings.

Figure 1:
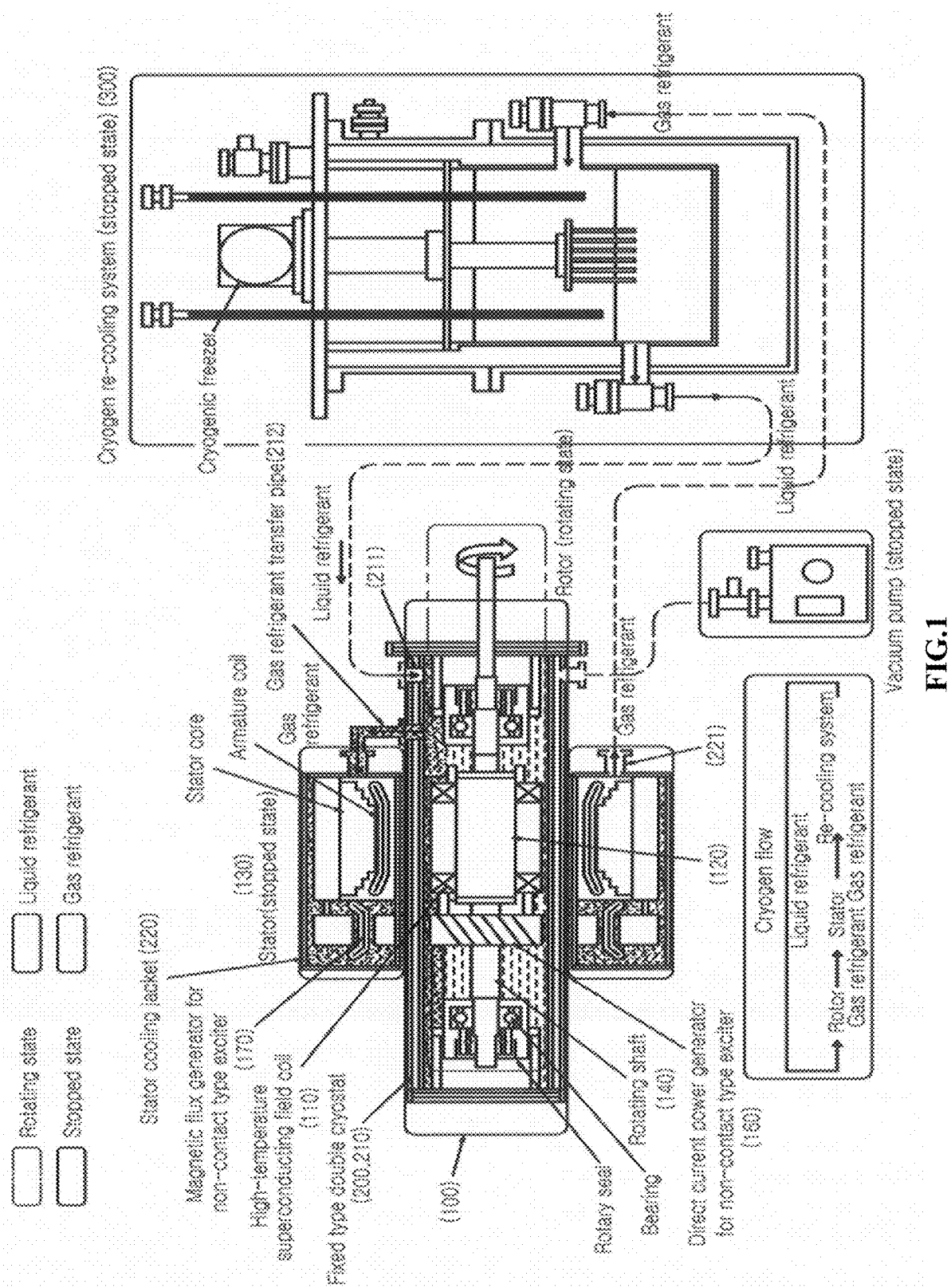
FIGS. 1 and 2 are exemplary views showing a high-temperature superconducting rotating machine system equipped with a fixed type rotor cryostat for cryogen and a vaporized cryogen re-use cooling structure according to an embodiment of the present invention.

As shown in FIG. 1, a high-temperature superconducting rotating machine system according to the present invention largely includes a superconducting rotating machine 100, a cryostat 200, and a cryogenic cooling system 300.

The superconducting rotating machine 100 has a rotor core 110 disposed vertically thereon, a rotor 120 provided by locating a high-temperature superconducting field coil in a circumferential direction of the rotor core 110, and a stator 130 provided by locating a superconducting armature coil in such a way as to be spaced apart from the rotor 120 by a given distance, so that upon rotation of the rotor 120, the stator 130 helps power generation (generator) and rotational force generation (motor), together with the rotor 120.

In this case, the rotor core 110 and the rotor 120 are coupled to a rotor shaft 140 on both longitudinal ends thereof by means of rotary seals and bearing, and next, the rotor core 110 and the rotor 120 rotate by means of a motor 150.

The cryostat 200 as a single outer case entirely surrounds the outer peripheral surfaces of the rotor 120 and the stator 130, and otherwise, the cryostat 200 individually surrounds the rotor 120 and the stator 130, thereby performing batch or individual cooling.

In this case, the cryogenic cooling system 300 supplies a liquid refrigerant to the cryostat 200 or collects and circulates a gas refrigerant from the cryostat 200.

According to an embodiment of the present invention, a direct current power generator and a magnetic flux generator for a non-contact type exciter are additionally provided (as shown in FIGS. 1 to 5), and in this case, the direct current power generator for the non-contact type exciter is disposed on one side of the high-temperature superconducting field coil of the rotor core 110 and has a flux pump header 160 that is electrically conductive to the rotor core 110 and interlockingly rotates with the rotor core 110.

In this case, the magnetic flux generator for the non-contact type exciter is disposed on the radial side of the flux pump header 160 and has permanent magnets or electromagnets 170 performing demagnetization or magnetization.

Figure 6:
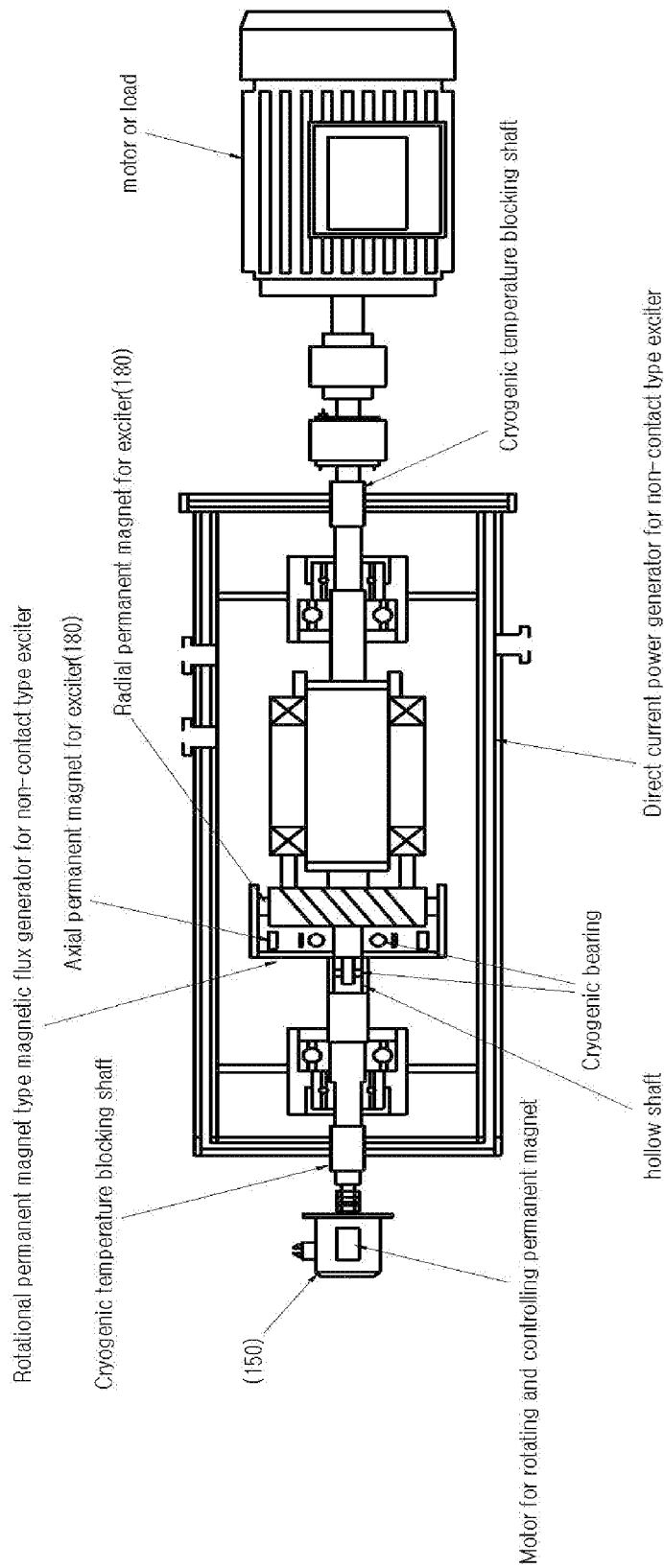
FIGS. 6 and 7 are exemplary views showing a high-temperature superconducting rotating machine system equipped with a fixed type rotor cryostat for cryogen and a vaporized cryogen re-use cooling structure according to additional embodiments of the present invention.
Figure 7:
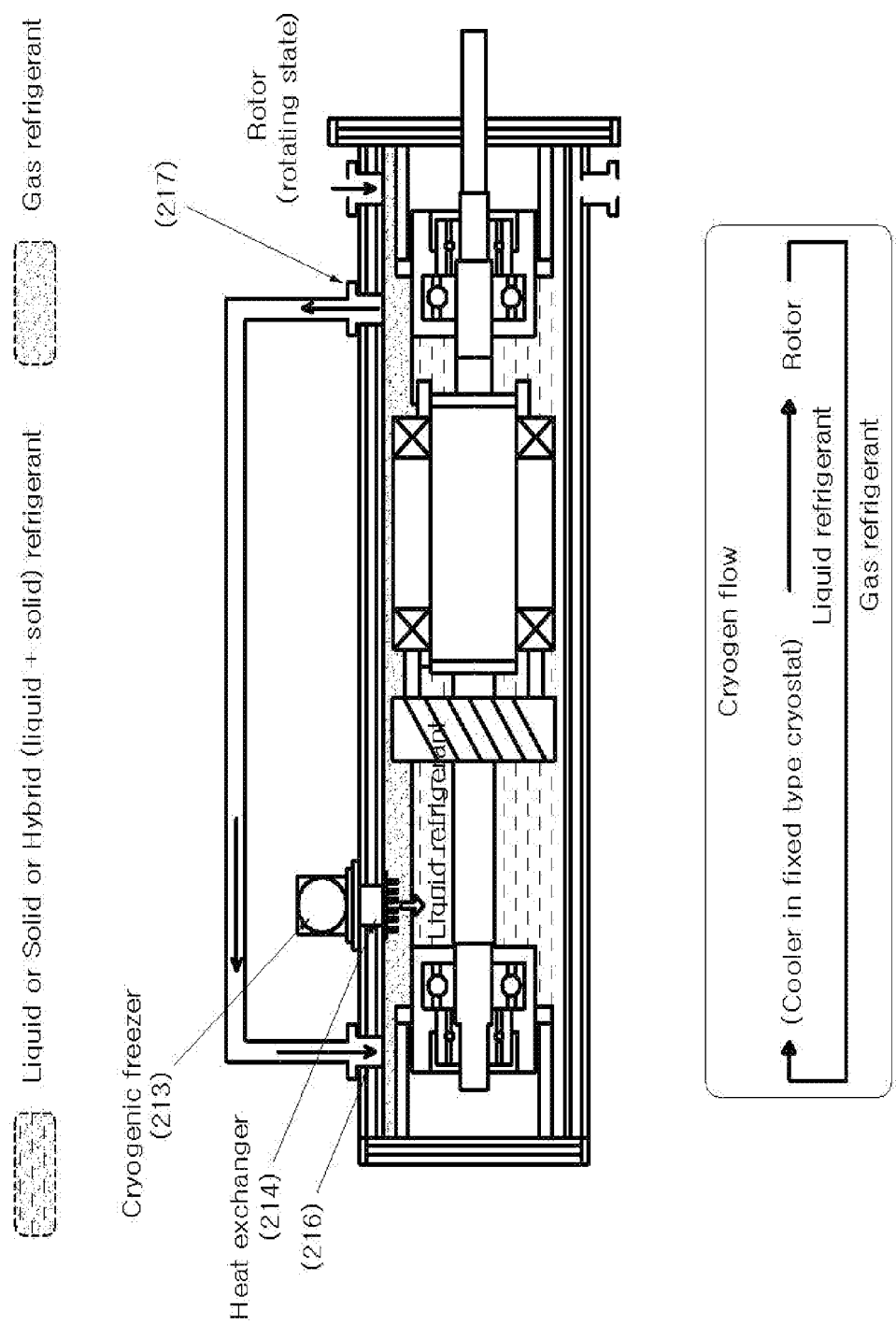

According to another embodiment of the present invention, a direct current power generator and a magnetic flux generator for a non-contact type exciter are additionally provided (as shown in FIGS. 6 and 7), and in this case, the direct current power generator for the non-contact type exciter is provided with a flux pump header 160 that is electrically conductive to one side of the high-temperature superconducting field coil of the rotor core 110 and interlockingly rotates with the rotor core 110.

In this case, the magnetic flux generator for the non-contact type exciter is provided with permanent magnets 180 for an exciter that are disposed on the axial and radial sides of the flux pump header 160, and the magnetic flux generator for the non-contact type exciter rotates by means of a rotary motor 190 coupled to the end of one side rotor shaft.

That is, FIG. 6 shows a configuration in which the magnetic flux generator for the non-contact type exciter is disposed inside the fixed type double cryostat.

In this case, the magnetic flux generator having the electromagnets (radial and axial permanent magnets) using copper wires is configured to allow the heat generated from the electromagnets to be cooled together with the rotor by means of the liquid refrigerant stored in the cryostat, thereby improving cooling performance and efficiency.

Further, a cooling structure in which the cooling structure of the magnetic flux generator and the direct current power generator for the non-contact type exciter is integrated with the fixed type double cryostat makes use of a wire material having the same specification as the high-temperature superconducting wire material used in the direct current power generator for a non-contact type exciter to allow the electromagnets of the magnetic flux generator to be superconductive to optimize energy density, thereby improving charging performance of the non-contact type exciter.

The magnetic flux generator using the electromagnets is configured to allow the electromagnets to be disposed in both of a radial direction and an axial direction.

The configuration where the permanent magnets or electromagnets are used as the magnetic flux generator for the non-contact type exciter enables the electromagnetic air gap with the direct current power generator for the non-contact type exciter to be minimized, thereby improving charging performance of the non-contact type exciter.

Further, the impregnation cooling structure of the rotor through the fixed type cryostat does not have to expose, to a normal temperature portion, the opposite side rotary shaft to one rotary shaft connected to a load as a rotational object of a motor required in a generator.

Such a structure can be utilized as a structure for mounting a magnetic flux generator for rotational permanent magnets in the application of the non-contact type exciter.

The magnetic flux generator for rotational permanent magnets is configured to allow a circular plate having the permanent magnets equally spaced apart from one another thereon in a circumferential direction thereof to be connected to a hollow shaft, to pass through a rotary coupling consisting of a rotary seal and a ceramic bearing, and to be connected to a motor located on a normal temperature portion, so that the permanent magnets are controlled in rotating directions and speeds to control the output of the non-contact type exciter.

In this case, the permanent magnets are arranged only in the radial direction or only in the axial direction, and otherwise, they may be arranged in both of the radial and axial directions.

Such a structure increases the number of direct current power sources generated by time-varying magnetic fluxes produced by the permanent magnets, thereby improving the output performance of the non-contact type exciter.

The direct current power generator for the non-contact type exciter and the shaft of the rotor having the high-temperature superconducting field coil rotate, while being supported against one or more cryogenic bearings disposed on the central portion of the circular plate coupled to the hollow shaft.

Through such a multiple bearing support structure, the circular plate for permanent magnets rotates and is controlled independently, irrespective of the rotation of the rotor for the rotating machine.

Further, a shaft, into which a structure made of a material having low thermal conductivity is inserted or which is made of the material, is located on the boundary where the rotor shaft passes through the double cryostat and is connected to the motor, to block a low temperature transferred to the normal temperature portion, thereby preventing the normal temperature portion from being frozen.

Accordingly, the radial and axial arrangements of the rotational permanent magnets are kept with at least air gap for physical rotations from the direct current power generator for the non-contact type exciter, so that the magnetic flux generator for the non-contact type exciter can minimize the air gap more than the magnetic flux generator that is located in the normal temperature portion on the boundary of the double cryostat, thereby optimizing the charging performance of the non-contact type exciter.

Further, as shown in FIG. 7, the fixed type rotor cryostat and the vaporized cryogen re-use cooling structure require a refrigerant re-cooling system for re-condensing the vaporized refrigerant discharged to the outside after cooling the rotor and the stator, and the refrigerant re-cooling system is basically located on the normal temperature portion and has an additional transfer pipe connected to the rotor to re-supply a re-cooled refrigerant.

However, such a structure causes the cryostat to be exposed to the normal temperature portion through the refrigerant transfer pipe, thereby causing cooling efficiency deterioration such as heat loss and pressure loss.

To solve such a problem, according to the present invention, the cryostat does not rotate, and a cryogenic freezer for re-cooling is directly connected to the cryostat.

That is, an additional flow path is formed to transfer the cryogen that cools the rotating machine including the rotor or stator and is then vaporized to a heat exchanger attached to the cryogenic freezer, and accordingly, the vaporized refrigerant is re-cooled in the cryogenic freezer being in a stopped state and then supplied and circulated.

As a result, an external cooling device is not required at all, thereby simplifying the system of the present invention in configuration, and additional equipment is not used at all, thereby reducing the installation volume of the system of the present invention to allow an installation site to become small in size.

Further, through the temperature control of the cryogenic freezer according to the types of refrigerants used, a liquid refrigerant, a solid refrigerant having a larger heat capacity than the liquid refrigerant, and a hybrid refrigerant in which the liquid refrigerant and the solid refrigerant are mixed, are produced to improve rotor cooling performance and current conduction performance of the high-temperature superconductor used in the rotor, thereby optimizing the energy density of the system.

In this case, the temperature and flow rate of the vaporized refrigerant collected and the temperatures of the rotor and the stator are normally monitored and fed back to an operating control program of the cryogenic freezer. The cryogenic freezer does not operate normally, but it operates only when the refrigerant re-cooling is needed, which optimizes the re-cooling sequence of the refrigerant to obtain high cooling efficiency.

Figure 2:
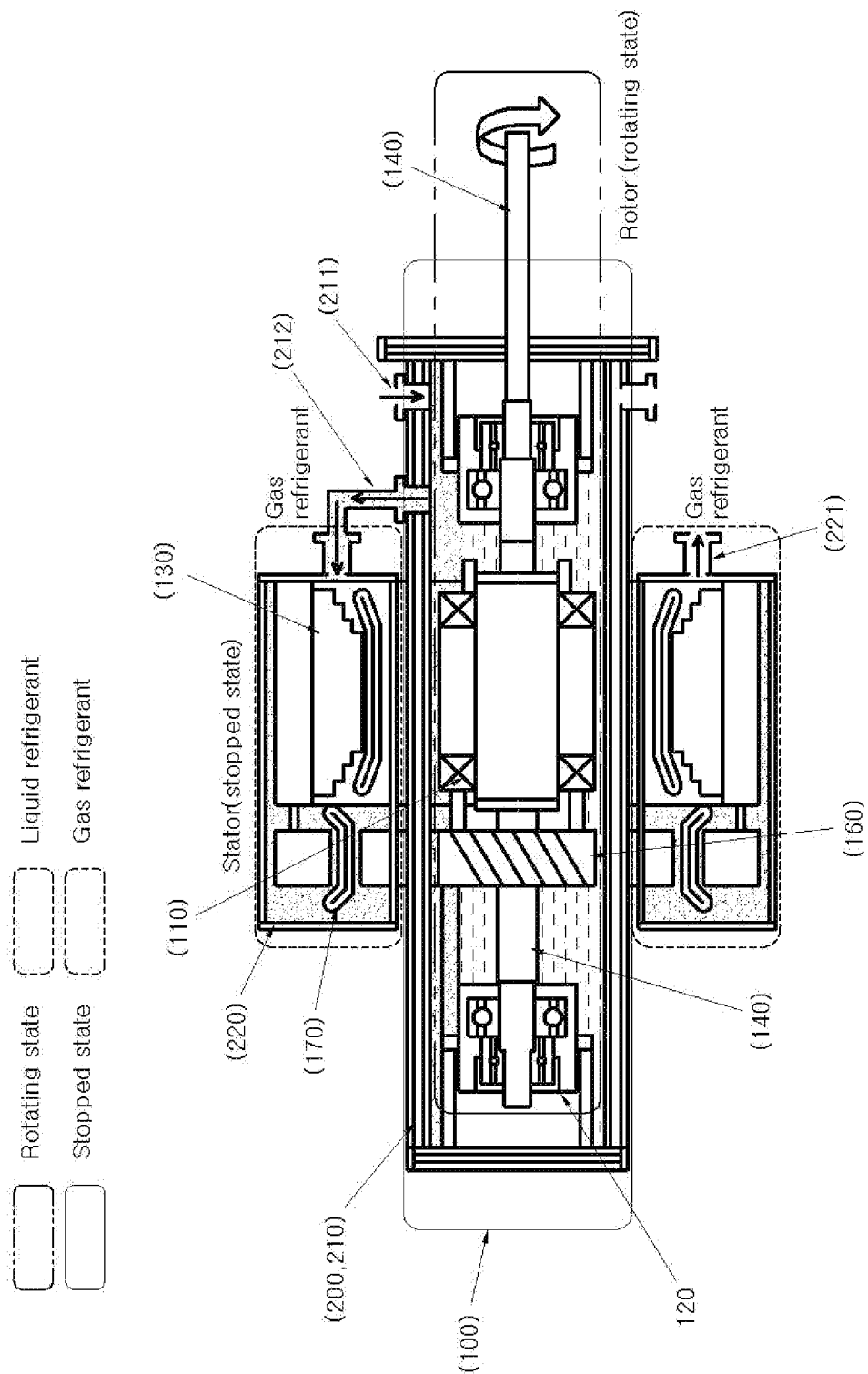

According to one embodiment of the division of the cryostat 200, as shown in FIGS. 1 and 2, the cryostat 200 has a main cooling chamber 210 for individually defining the direct current power generator for the non-contact type exciter with the flux pump header 160, the rotor 120, and portions of both sides of the rotor shaft 140 branched along an axial line of the rotor 120.

In this case, a sub cooling chamber 220 is additionally defined in a radial direction of the main cooling chamber 210, and the sub cooling chamber 220 individually defines the stator 130, the permanent magnets or electromagnets 170 or the permanent magnets 180 for the exciter of the magnetic flux generator for the non-contact type exciter.

Accordingly, an inlet pipe 211 is located on one side of the main cooling chamber 210 to introduce the liquid refrigerant, and a communication pipe 212 is located on the other side of the main cooling chamber 210 to transfer the vaporized gas refrigerant to the sub cooling chamber 220.

In this case, the sub cooling chamber 220 has a discharge pipe 221 disposed on the outer surface thereof in such a way as to be connected to the cryogenic cooling system 300 to perform external circulation of the gas refrigerant.

Figure 3:
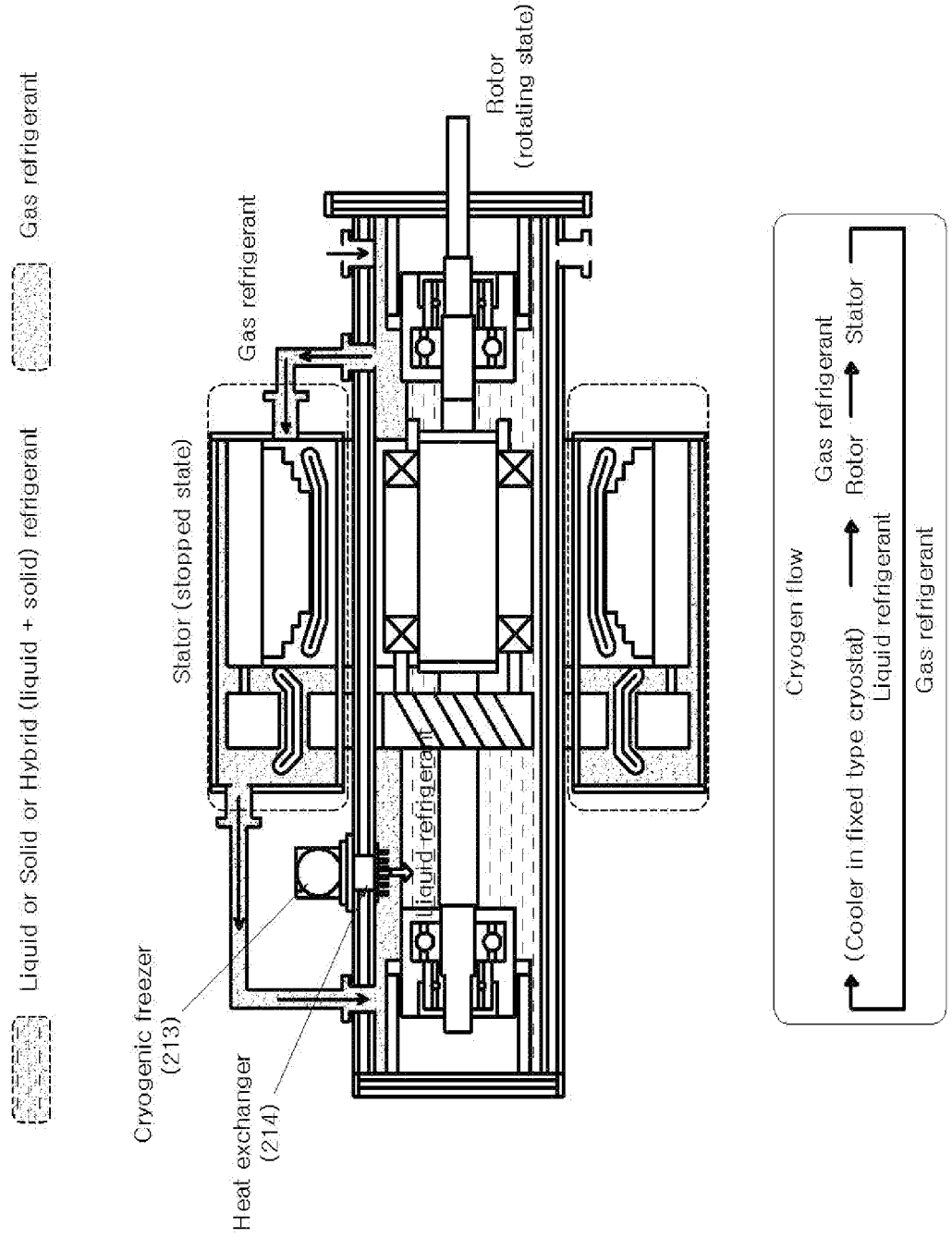
FIG. 3 is an exemplary view showing a state wherein a gas refrigerant collected and circulated in FIG. 1 is re-condensed and re-liquefied within a rotor through a freezer and a heat exchanger directly connected to the fixed type rotor cryostat according to the present invention.

According to another embodiment of the division of the cryostat 200, further, as shown in FIG. 3, the sub cooling chamber 220 has a return supply pipe 222 disposed on one side of the outer surface thereof in such a way as to be connected to a collection pipe 215 of the main cooling chamber 210.

In this case, the main cooling chamber 210 has a re-condensing cooler 213 and a re-condensing heat exchanger 214 disposed on one side of the inside thereof to perform re-condensation and re-liquefication of the gas refrigerant supplied from the sub cooling chamber 220.

Figure 4:
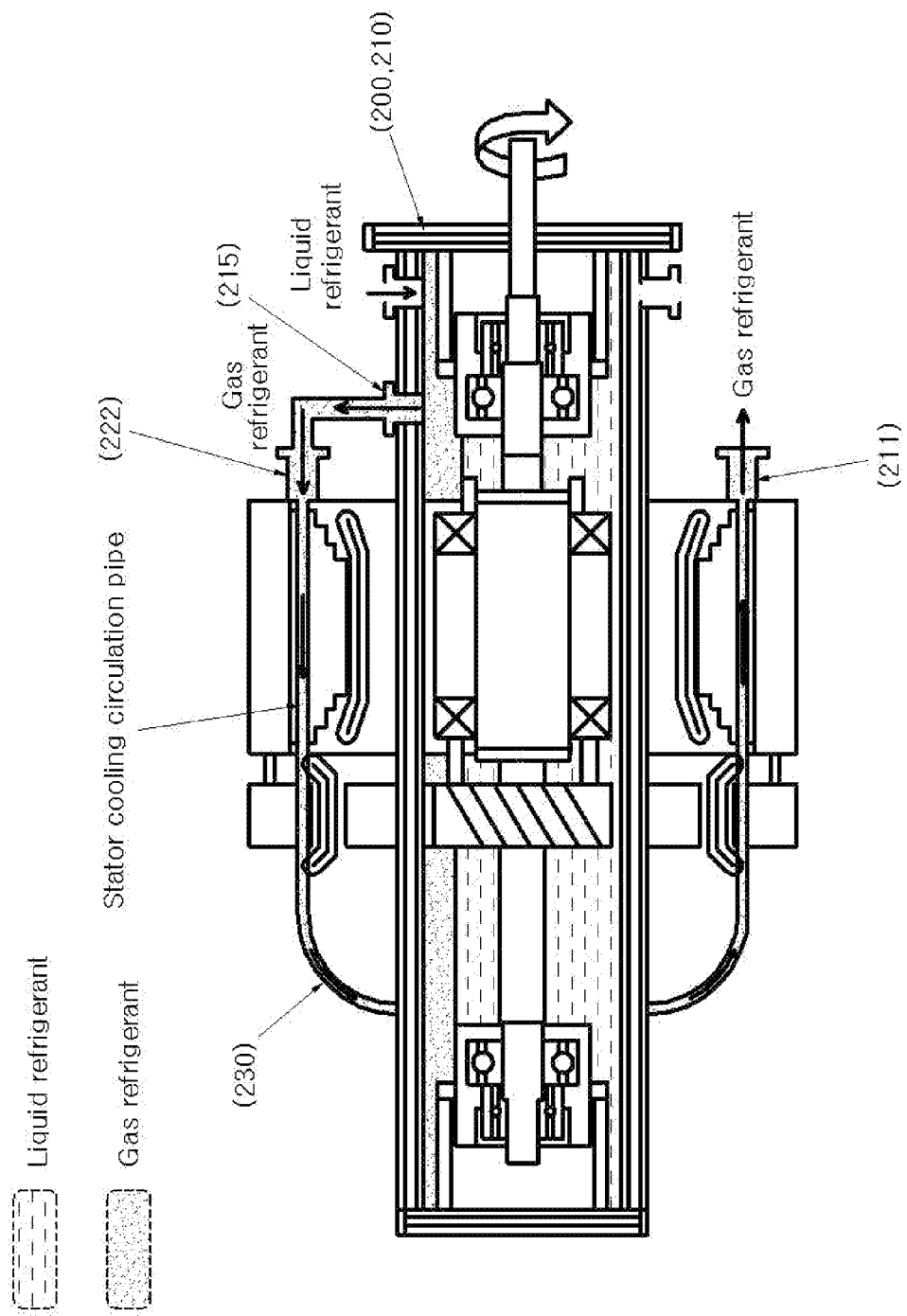
FIG. 4 is an exemplary view showing a high-temperature superconducting rotating machine system equipped with a fixed type rotor cryostat for cryogen and a vaporized cryogen re-use cooling structure according to another embodiment of the present invention.

According to yet another embodiment of the division of the cryostat 200, further, as shown in FIG. 4, the cryostat 200 has a main cooling chamber 210 for individually defining the direct current power generator for the non-contact type exciter with the flux pump header 160, the rotor 120, and portions of both sides of the rotor shaft 140 branched along an axial line of the rotor 120.

In this case, a sub cooling pipe 230 is additionally defined in a radial direction of the main cooling chamber 210, and the sub cooling pipe 230 individually defines, in the form of a connection pipe or hose, the stator 130, the permanent magnets or electromagnets 170 or the permanent magnets 180 for the exciter of the magnetic flux generator for the non-contact type exciter.

Accordingly, an inlet pipe 211 is located on one side of the main cooling chamber 210 to introduce the liquid refrigerant, and a communication pipe 212 is located on the other side of the main cooling chamber 210 to transfer the vaporized gas refrigerant to the sub cooling pipe 230.

In this case, the sub cooling pipe 230 has a discharge pipe 221 disposed on the end portion thereof in the longitudinal direction thereof in such a way as to be connected to the cryogenic cooling system 300 to perform external circulation of the gas refrigerant.

Figure 5:
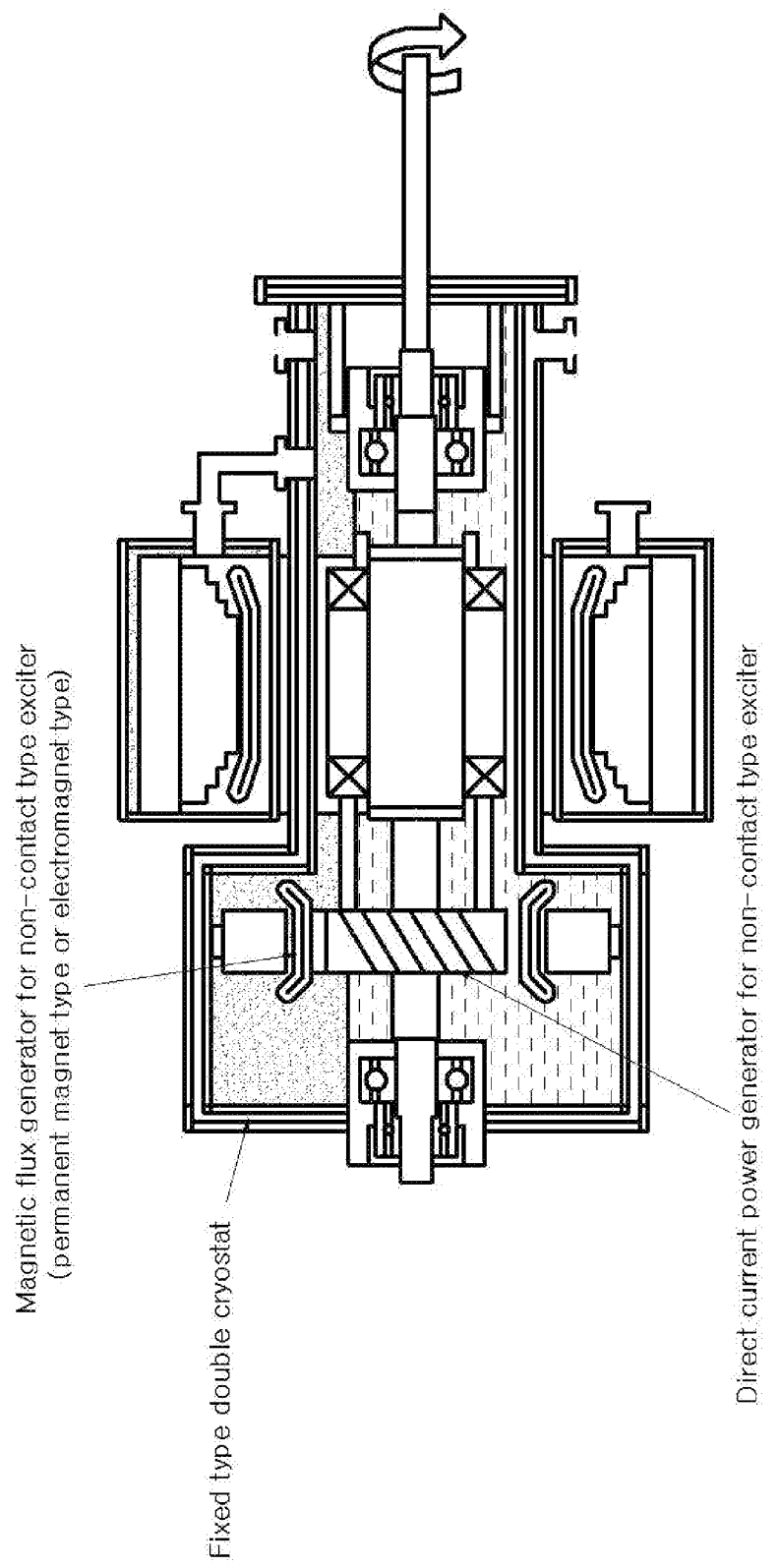
FIG. 5 is an exemplary view showing a high-temperature superconducting rotating machine system equipped with a fixed type rotor cryostat for cryogen and a vaporized cryogen re-use cooling structure according to yet another embodiment of the present invention.

According to still another embodiment of the division of the cryostat 200, further, as shown in FIG. 5, the cryostat 200 has a main cooling chamber 210 for individually defining the direct current power generator for the non-contact type exciter with the flux pump header 160, the magnetic flux generator for the non-contact type exciter with the permanent magnets or electromagnets 170, the rotor 120, and portions of both sides of the rotor shaft 140 branched along an axial line of the rotor 120.

In this case, a sub cooling chamber 220 is additionally defined in a radial direction of the main cooling chamber 210.

The sub cooling chamber 220 individually defines only the outer peripheral surface of the stator 130, and an inlet pipe 211 is located on one side of the main cooling chamber 210 to introduce the liquid refrigerant.

Further, a communication pipe 212 is located on the other side of the main cooling chamber 210 to transfer the vaporized gas refrigerant to the sub cooling chamber 220, and the sub cooling chamber 220 has a discharge pipe 221 disposed on the outer surface thereof in such a way as to be connected to the cryogenic cooling system 300 to perform external circulation of the gas refrigerant.

According to yet still another embodiment of the division of the cryostat 200, further, as shown in FIG. 6, the cryostat 200 has a main cooling chamber 210 for individually defining the direct current power generator for the non-contact type exciter with the flux pump header 160, the magnetic flux generator for the non-contact type exciter with the permanent magnets 180 for the exciter, the rotor 120, and portions of both sides of the rotor shaft 140 branched along an axial line of the rotor 120.

In this case, a sub cooling chamber 220 is additionally defined in a radial direction of the main cooling chamber 210, and the sub cooling chamber 220 individually defines only the outer peripheral surface of the stator 130.

Accordingly, an inlet pipe 211 is located on one side of the main cooling chamber 210 to introduce the liquid refrigerant, and a communication pipe 212 is located on the other side of the main cooling chamber 210 to transfer the vaporized gas refrigerant to the sub cooling chamber 220.

In this case, the sub cooling chamber 220 has a discharge pipe 221 disposed on the outer surface thereof in such a way as to be connected to the cryogenic cooling system 300 to perform external circulation of the gas refrigerant.

Further, as shown in FIG. 7, the main cooling chamber 210 has a re-circulation supply pipe 217 disposed on one side of the outer surface thereof in such a way as to be connected to a bypass pipe 216 disposed on the other side thereof.

In this case, the main cooling chamber 210 has a re-condensing cooler 213 and a re-condensing heat exchanger 214 disposed on one side of the inside thereof to perform re-condensation and re-liquefication of the circulated gas refrigerant.

Further, the cryostat 200 is formed of a double jacket consisting of an inner case and an outer case, and a vacuum is formed in a space between the inner case and the outer case.

That is, the fixed type rotor cryostat and the vaporized cryogen re-use cooling structure require the refrigerant re-cooling system for re-condensing the vaporized refrigerant discharged to the outside after cooling the rotor and the stator.

According to the present invention, the cryostat does not rotate, and the cryogenic freezer for re-cooling is directly connected to the cryostat.

As a result, the flow path is formed to transfer the cryogen that cools the rotating machine including the rotor or stator and is then vaporized to the heat exchanger attached to the cryogenic freezer, and accordingly, the vaporized refrigerant is re-cooled in the cryogenic freezer being in a stopped state and then supplied and circulated, which requires no external cooling device to reduce the volume of the system.

Further, through the temperature control of the cryogenic freezer according to the types of refrigerants used, a liquid refrigerant, a solid refrigerant having a larger heat capacity than the liquid refrigerant, and a hybrid refrigerant in which the liquid refrigerant and the solid refrigerant are mixed, are produced to improve rotor cooling performance and current conduction performance of the high-temperature superconductor used in the rotor, thereby optimizing the energy density of the system.

In this case, the temperature and flow rate of the vaporized refrigerant collected and the temperatures of the rotor and the stator are normally monitored and fed back to the operating control program of the cryogenic freezer. The cryogenic freezer does not operate normally, but it operates only when the refrigerant re-cooling is needed, which optimizes the re-cooling sequence of the refrigerant to obtain high cooling efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXPLANATIONS OF REFERENCE NUMERALS ABSTRACT

100 . . . Superconducting rotating machine
110 . . . Rotor core
120 . . . Rotor
130 . . . Stator
140 . . . Rotor shaft
141 . . . Inlet pipe
142 . . . Outlet pipe
150 . . . Motor
160 . . . Flux pump header
170 . . . Permanent magnet or electromagnet
180 . . . Permanent magnet for exciter
190 . . . Rotary motor
200 . . . Cryostat
210 . . . Main cooling chamber
211 . . . Inlet pipe
212 . . . Communication pipe
213 . . . Cooler
214 . . . Heat exchanger
215 . . . Collection pipe
216 . . . Bypass pipe
217 . . . Re-circulation supply pipe
220 . . . Sub cooling chamber
221 . . . Discharge pipe
222 . . . Return supply pipe
230 . . . Sub cooling pipe
300 . . . Cryogenic cooling system

The invention claimed is:

1. A high-temperature superconducting rotating machine system equipped with a fixed type rotor cryostat for cryogen and a vaporized cryogen re-use cooling structure, the high-temperature superconducting rotating machine system comprising:

a superconducting rotating machine having a rotor core disposed vertically thereon, a rotor provided by locating a high-temperature superconducting field coil in a circumferential direction of the rotor core, and a stator provided by locating a superconducting armature coil on the outside of the rotor, the rotor core and the rotor being connected to a rotor shaft on both longitudinal ends thereof to rotate supportedly by rotary seals and support bearings;

a cryostat for entirely surrounding the outer peripheral surfaces of the rotor and the stator, as a single outer case, or individually surrounding the rotor and the stator, to perform cooling for both of the rotor and the stator or for the rotor and the stator individually; and a cryogenic cooling system for supplying a liquid refrigerant to the cryostat or collecting and circulating a gas refrigerant from the cryostat, wherein the superconducting rotating machine has a direct current power generator for a non-contact type exciter disposed on one side of the high-temperature superconducting field coil of the rotor core and having a flux pump header electrically conductive to the rotor core in such a way as to interlockingly rotate with the rotor core and a magnetic flux generator for a non-contact type exciter having permanent magnets or electromagnets disposed on the radial side of the flux pump header to perform demagnetization or magnetization, and wherein the cryostat comprises a main cooling chamber for individually defining the direct current power generator for the non-contact type exciter with the flux pump header, the rotor, and portions of both sides of the rotor shaft branched along an axial line of the rotor, a sub cooling chamber additionally defined in a radial direction of the main cooling chamber to individually define the stator, the permanent magnets or electromagnets or the permanent magnets for the exciter of the magnetic flux generator for the non-contact type exciter, an inlet pipe located on one side of the main cooling chamber to introduce the liquid refrigerant, a communication pipe located on the other side of the main cooling chamber to transfer the vaporized gas refrigerant to the sub cooling chamber, and a discharge pipe disposed on the outer surface of the sub cooling chamber in such a way as to be connected to the cryogenic cooling system to perform external circulation of the gas refrigerant.

2. The high-temperature superconducting rotating machine system according to claim 1, wherein the sub cooling chamber has a return supply pipe disposed on one side of the outer surface thereof in such a way as to be connected to a collection pipe of the main cooling chamber, and the main cooling chamber has a re-condensing cooler and a re-condensing heat exchanger disposed on one side of the inside thereof to perform re-condensation and re-liquefication of the gas refrigerant supplied from the sub cooling chamber.

3. The high-temperature superconducting rotating machine system according to claim 1, wherein the cryostat is formed of a double jacket consisting of an inner case and an outer case, and a vacuum is formed in a space between the inner case and the outer case.

4. A high-temperature superconducting rotating machine system equipped with a fixed type rotor cryostat for cryogen and a vaporized cryogen re-use cooling structure, the high-temperature superconducting rotating machine system comprising:

a superconducting rotating machine having a rotor core disposed vertically thereon, a rotor provided by locating a high-temperature superconducting field coil in a circumferential direction of the rotor core, and a stator provided by locating a superconducting armature coil on the outside of the rotor, the rotor core and the rotor being connected to a rotor shaft on both longitudinal ends thereof to rotate supportedly by rotary seals and support bearings;

a cryostat for entirely surrounding the outer peripheral surfaces of the rotor and the stator, as a single outer case, or individually surrounding the rotor and the stator, to perform cooling for both of the rotor and the stator or for the rotor and the stator individually; and a cryogenic cooling system for supplying a liquid refrigerant to the cryostat or collecting and circulating a gas refrigerant from the cryostat, wherein the superconducting rotating machine has a direct current power generator for a non-contact type exciter disposed on one side of the high-temperature superconducting field coil of the rotor core and having a flux pump header electrically conductive to the rotor core in such a way as to interlockingly rotate with the rotor core and a magnetic flux generator for a non-contact type exciter having permanent magnets or electromagnets disposed on the radial side of the flux pump header to perform demagnetization or magnetization, and wherein the cryostat comprises a main cooling chamber for individually defining the direct current power generator for the non-contact type exciter with the flux pump header, the rotor, and portions of both sides of the rotor shaft branched along an axial line of the rotor, a sub cooling pipe additionally defined in a radial direction of the main cooling chamber to individually define, in the form of a connection pipe or hose, the stator, the permanent magnets or electromagnets or the permanent magnets for the exciter of the magnetic flux generator for the non-contact type exciter, an inlet pipe located on one side of the main cooling chamber to introduce the liquid refrigerant, a communication pipe located on the other side of the main cooling chamber to transfer the vaporized gas refrigerant to the sub cooling pipe, and a discharge pipe disposed on the end portion of the sub cooling pipe in a longitudinal direction in such a way as to be connected to the cryogenic cooling system to perform external circulation of the gas refrigerant.

5. A high-temperature superconducting rotating machine system equipped with a fixed type rotor cryostat for cryogen and a vaporized cryogen re-use cooling structure, the high-temperature superconducting rotating machine system comprising:

a superconducting rotating machine having a rotor core disposed vertically thereon, a rotor provided by locating a high-temperature superconducting field coil in a circumferential direction of the rotor core, and a stator provided by locating a superconducting armature coil on the outside of the rotor, the rotor core and the rotor being connected to a rotor shaft on both longitudinal ends thereof to rotate supportedly by rotary seals and support bearings;

a cryostat for entirely surrounding the outer peripheral surfaces of the rotor and the stator, as a single outer case, or individually surrounding the rotor and the stator, to perform cooling for both of the rotor and the stator or for the rotor and the stator individually; and a cryogenic cooling system for supplying a liquid refrigerant to the cryostat or collecting and circulating a gas refrigerant from the cryostat, wherein the superconducting rotating machine has a direct current power generator for a non-contact type exciter disposed on one side of the high-temperature superconducting field coil of the rotor core and having a flux pump header electrically conductive to the rotor core in such a way as to interlockingly rotate with the rotor core and a magnetic flux generator for a non-contact type exciter having permanent magnets or electromagnets disposed on the radial side of the flux pump header to perform demagnetization or magnetization, and wherein the cryostat comprises a main cooling chamber for individually defining the direct current power generator for the non-contact type exciter with the flux pump header, the magnetic flux generator for the non-contact type exciter with the permanent magnets or electromagnets, the rotor, and portions of both sides of the rotor shaft branched along an axial line of the rotor, a sub cooling chamber additionally defined in a radial direction of the main cooling chamber to individually define only the outer peripheral surface of the stator, an inlet pipe located on one side of the main cooling chamber to introduce the liquid refrigerant, a communication pipe located on the other side of the main cooling chamber to transfer the vaporized gas refrigerant to the sub cooling chamber, and a discharge pipe disposed on the outer surface of the sub cooling chamber in such a way as to be connected to the cryogenic cooling system to perform external circulation of the gas refrigerant.

6. A high-temperature superconducting rotating machine system equipped with a fixed type rotor cryostat for cryogen and a vaporized cryogen re-use cooling structure, the high-temperature superconducting rotating machine system comprising:

a superconducting rotating machine having a rotor core disposed vertically thereon, a rotor provided by locating a high-temperature superconducting field coil in a circumferential direction of the rotor core, and a stator provided by locating a superconducting armature coil on the outside of the rotor, the rotor core and the rotor being connected to a rotor shaft on both longitudinal ends thereof to rotate supportedly by rotary seals and support bearings;

a cryostat for entirely surrounding the outer peripheral surfaces of the rotor and the stator, as a single outer case, or individually surrounding the rotor and the stator, to perform cooling for both of the rotor and the stator or for the rotor and the stator individually; and a cryogenic cooling system for supplying a liquid refrigerant to the cryostat or collecting and circulating a gas refrigerant from the cryostat, wherein the superconducting rotating machine comprises a direct current power generator for a non-contact type exciter disposed on one side of the high-temperature superconducting field coil of the rotor core and having a flux pump header electrically conductive to the rotor core in such a way as to interlockingly rotate with the rotor core and a magnetic flux generator for a non-contact type exciter having permanent magnets for an exciter disposed on the radial and axial sides of the flux pump header and rotating by means of a rotary motor coupled to the end of one side rotor shaft, and wherein the cryostat comprises a main cooling chamber for individually defining the direct current power generator for the non-contact type exciter with the flux pump header, the magnetic flux generator for the non-contact type exciter with the permanent magnets for the exciter, the rotor, and portions of both sides of the rotor shaft branched along an axial line of the rotor, a sub cooling chamber additionally defined in a radial direction of the main cooling chamber to individually define only the outer peripheral surface of the stator, an inlet pipe located on one side of the main cooling chamber to introduce the liquid refrigerant, a communication pipe located on the other side of the main cooling chamber to transfer the vaporized gas refrigerant to the sub cooling chamber, and a discharge pipe disposed on the outer surface of the sub cooling chamber in such a way as to be connected to the cryogenic cooling system (300) to perform external circulation of the gas refrigerant.

7. The high-temperature superconducting rotating machine system according to claim 6, wherein the main cooling chamber has a re-circulation supply pipe disposed on one side of the outer surface thereof in such a way as to be connected to a bypass pipe disposed on the other side thereof, and the main cooling chamber has the re-condensing cooler and the re-condensing heat exchanger disposed on one side of the inside thereof to perform re-condensation and re-liquefication of the gas refrigerant supplied from the sub cooling chamber.

* * * * *